(12) United States Patent
Okamoto et al.

(10) Patent No.: US 10,056,799 B2
(45) Date of Patent: Aug. 21, 2018

(54) ROTATING ELECTRIC MACHINE

(71) Applicant: MITSUBISHI ELECTRIC CORPORATION, Tokyo (JP)

(72) Inventors: Shogo Okamoto, Tokyo (JP); Ken Nishikawa, Tokyo (JP); Masashi Nakamura, Tokyo (JP); Akihiro Yamamura, Tokyo (JP); Kota Hirohashi, Tokyo (JP); Yoshiki Kuwahara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 172 days.

(21) Appl. No.: 14/911,776

(22) PCT Filed: Dec. 19, 2013

(86) PCT No.: PCT/JP2013/007460
§ 371 (c)(1),
(2) Date: Feb. 12, 2016

(87) PCT Pub. No.: WO2015/092833
PCT Pub. Date: Jun. 25, 2015

(65) Prior Publication Data
US 2016/0190886 A1  Jun. 30, 2016

(51) Int. Cl.
*H02K 3/26* (2006.01)
*H02K 3/34* (2006.01)
(Continued)

(52) U.S. Cl.
CPC ............... *H02K 3/28* (2013.01); *H02K 1/12* (2013.01); *H02K 3/18* (2013.01); *H02K 3/34* (2013.01);
(Continued)

(58) Field of Classification Search
CPC .. H02K 11/0094; H02K 1/12; H02K 2203/09; H02K 3/18; H02K 3/28; H02K 3/34; H02K 3/522
(Continued)

(56) References Cited

U.S. PATENT DOCUMENTS 7,944,112 B2 * 5/2011 Kim ...................... D06F 37/304
                                                          310/266
8,288,903 B2 * 10/2012 Matsuda ................ H02K 1/148
                                                          310/43
(Continued)

FOREIGN PATENT DOCUMENTS

CN  101964554 A   2/2011
EP     2110925 A1  10/2009
(Continued)

OTHER PUBLICATIONS

International Search Report of PCT/JP2013/007460, dated Apr. 1, 2014. [PCT/ISA/210].
(Continued)

*Primary Examiner* — Alex W Mok
(74) *Attorney, Agent, or Firm* — Sughrue Mion, PLLC; Richard C. Turner

(57) ABSTRACT

A coil group 23G is composed of windings 23U to 23W for U phase, V phase, and W phase. One ends 23U1 to 23W1 of the windings for the respective phases composing the coil group 23G are connected to respective power supply bus bars 25U to 25W, and the other ends 23U2 and 23W2 of the windings for the phases positioned at both ends in the circumferential direction in the coil group 23G extend toward the other end 23V2 of the winding for the rest of the phases, whereby the other ends 23U2 to 23W2 of the windings for the respective phases are mutually connected.

8 Claims, 8 Drawing Sheets

(51) Int. Cl.
*H02K 11/00* (2016.01)
*H02K 1/12* (2006.01)
*H02K 3/28* (2006.01)
*H02K 3/18* (2006.01)
*H02K 3/52* (2006.01)

(52) U.S. Cl.
CPC ......... *H02K 3/522* (2013.01); *H02K 11/0094* (2013.01); *H02K 2203/09* (2013.01)

(58) Field of Classification Search
USPC .......................................................... 310/71
See application file for complete search history.

(56) References Cited

U.S. PATENT DOCUMENTS

| | | | | |
|---|---|---|---|---|
| 2005/0242677 | A1* | 11/2005 | Akutsu | H02K 3/28 310/179 |
| 2009/0184591 | A1* | 7/2009 | Hoshino | H02K 3/24 310/54 |
| 2009/0256439 | A1 | 10/2009 | Inoue et al. | |
| 2011/0020154 | A1* | 1/2011 | Matsuda | H02K 1/148 417/410.1 |
| 2011/0234031 | A1 | 9/2011 | Kato | |
| 2012/0286619 | A1 | 11/2012 | Tsuiki et al. | |
| 2015/0035397 | A1* | 2/2015 | Okinaga | H02K 3/28 310/71 |

FOREIGN PATENT DOCUMENTS

| | | | | |
|---|---|---|---|---|
| EP | 2369722 | A2 | 9/2011 | |
| EP | 2827475 | A1 * | 1/2015 | ............... H02K 3/28 |
| JP | 2000232745 | A * | 8/2000 | ............... H02K 3/18 |
| JP | 2002-101596 | A | 4/2002 | |
| JP | 2008-312276 | A | 12/2008 | |
| JP | 2009148093 | A * | 7/2009 | ............... H02K 3/24 |
| JP | 2010-110160 | A | 5/2010 | |
| JP | 2010252507 | A | 11/2010 | |
| JP | 2011250513 | A * | 12/2011 | |
| JP | 2012-217303 | A | 11/2012 | |
| JP | 2013162673 | A | 8/2013 | |
| WO | 2013005537 | A1 | 1/2013 | |
| WO | WO 2013136646 | A1 * | 9/2013 | ............... H02K 3/28 |

OTHER PUBLICATIONS

Communication dated Jul. 10, 2017, from the European Patent Office in counterpart European application No. 13899576.6.
Communication dated Nov. 15, 2017, issued by the State Intellectual Property Office of People's Republic of China in counterpart Chinese application No. 201380081726.6.
Communication dated Mar. 23, 2018 from the European Patent Office in counterpart Application No. 13 899 576.6.
Communication dated May 8, 2018, from the State Intellectual Property Office of People's Republic of China in counterpart Application No. 201380081726.6.

* cited by examiner (a)

(b)

ROTATING ELECTRIC MACHINE

CROSS REFERENCE TO RELATED APPLICATIONS

This application is a National Stage of International Application No. PCT/JP2013/007460 filed Dec. 19, 2013, the contents of all of which are incorporated herein by reference in their entirety.

TECHNICAL FIELD

The present invention relates to a winding wound on a stator of a rotating electric machine.

BACKGROUND ART

A stator of a three-phase brushless motor includes: a stator core as a core; a winding wound around the outer circumference of a tooth of the stator core; a bus bar electrically connected to an end of the coil; and an insulating holder holding the bus bars in an insulating manner and provided at an end of the stator core. An example of rotating electric machines having such a stator is disclosed in Patent Document 1.

In the rotating electric machine disclosed in Patent Document 1, a plurality of windings for each of U phase, V phase, W phase are provided at the peripheral part of a stator core (stator core), and the windings for each phase are connected via a bus ring (bus bar). A bus ring for U-phase connection, a bus ring for V-phase connection, a bus ring for W-phase connection, and a bus ring for neutral point connection are provided. Among these, the bus rings for phase connection are provided on one of both end sides in the axial direction of the stator core, and the bus ring for neutral point connection is provided on the other one of both end sides in the axial direction of the stator core, in this rotating electric machine, the bus rings for phase connection and the bus ring for neutral point connection are provided in a divided manner on one and the other one of both end sides in the axial direction of the stator core, thereby preventing a space for providing these bus rings from being needed on only one end side in the axial direction of the stator core, thus enabling reduction in the outer-diameter dimension of the stator.

CITATION LIST

Patent Document

Patent Document 1: Japanese Laid-Open Patent Publication No. 2010-110160 (FIG. 1)

SUMMARY OF THE INVENTION

Problems to be Solved by the Invention

In the rotating electric machine disclosed in Patent Document 1, the bus bars for phase connection and the bus bar for neutral point connection are divided to one end side and the other end side in the axial direction of the stator core, whereby the outer-diameter dimension of the stator can be reduced. However, since the bus bars are provided at both ends in the axial direction of the stator core, the windings wound at the peripheral part of the stator core, particularly, coil end portions are covered by the bus bars, resulting in a problem of reducing the cooling performance for the coil end portions.

In the case where the bus bars for phase connection and the bus bar for neutral point connection are provided on only one end side in the axial direction of the stator core, since coil end portions on the other end side in the axial direction of the stator core are not covered by the bus bars, a refrigerant (e.g., cooling wind, cooling oil) collides with the coil end portions and cools the coil end portions. However, there is a problem that the outer-diameter dimension of the stator increases.

The present invention has been made to solve the above problems, and an object of the present invention is to provide a rotating electric machine in which the outer-diameter dimension of the stator is reduced and the cooling performance for the windings wound on the stator core is improved.

Solution to the Problems

A rotating electric machine according to the present invention includes: a stator core having an annular core back and a plurality of teeth; a plurality of windings for each of U phase, V phase, and W phase wound around the teeth and each having one end and the other end extending from one and the other one of both end sides in an axial direction of the stator core; a bobbin insulating the stator core and each winding from each other; and a power supply bus bar for each of U phase, V phase, and W phase provided on the one of both end sides in the axial direction of the stator core. A coil group is composed of the windings for U phase, V phase, and W phase. The one end of each winding composing each coil group is connected to the power supply bus bar for the corresponding phase. Among these windings, the other ends of the windings for the phases positioned at both ends extend toward the other end of the winding for the rest of the phases, whereby the other ends of the windings for the respective phases are mutually connected.

Effect of the Invention

The present invention can provide a rotating electric machine in which the outer-diameter dimension of the stator is reduced and the cooling performance for the windings wound on the stator core is improved.

DESCRIPTION OF EMBODIMENTS

Embodiment 1

Figure 1:
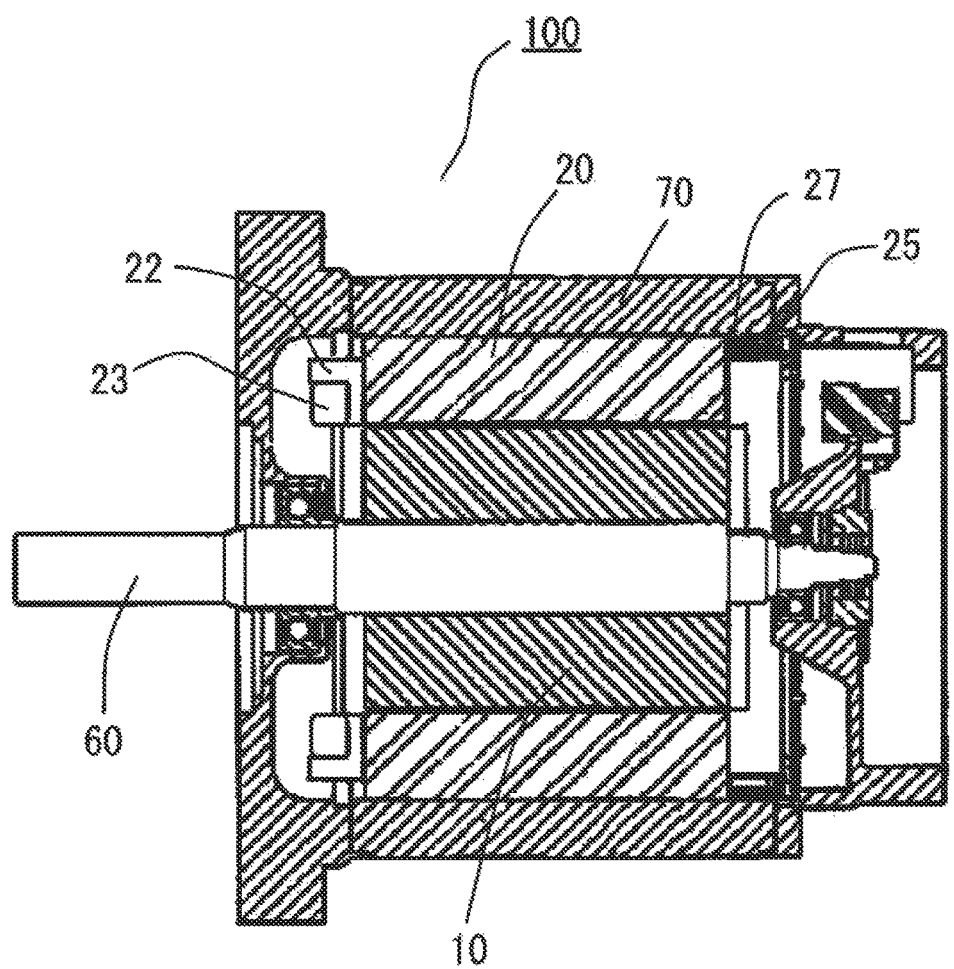
FIG. 1 is a sectional view of a rotating electric machine 100 according to embodiment 1 of the present invention.

Hereinafter, embodiment 1 of the present invention will be described based on FIG. 1 to FIG. 10, in which the same or corresponding members and portions are denoted by the same reference characters.

Figure 2:
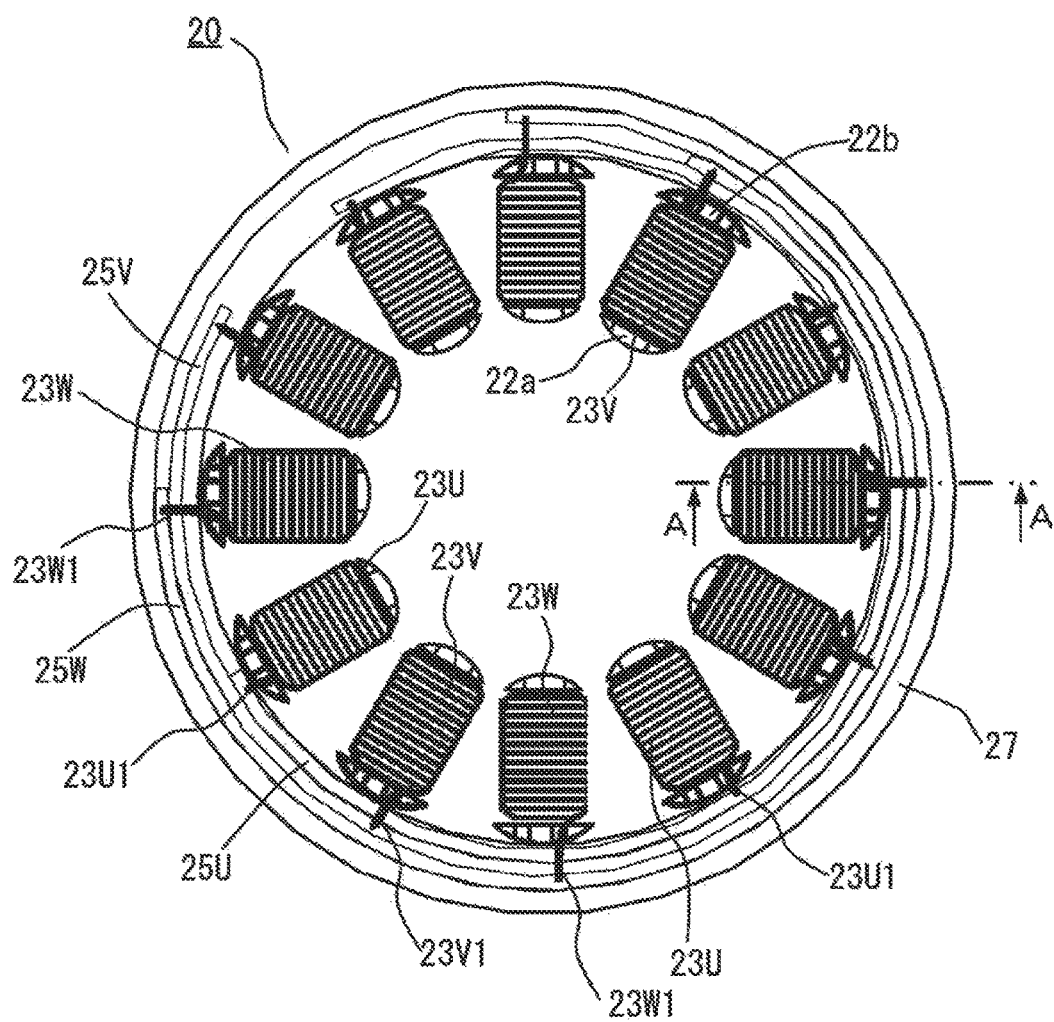
FIG. 2 is a front plan view of a stator 20 in FIG. 1.
Figure 3:
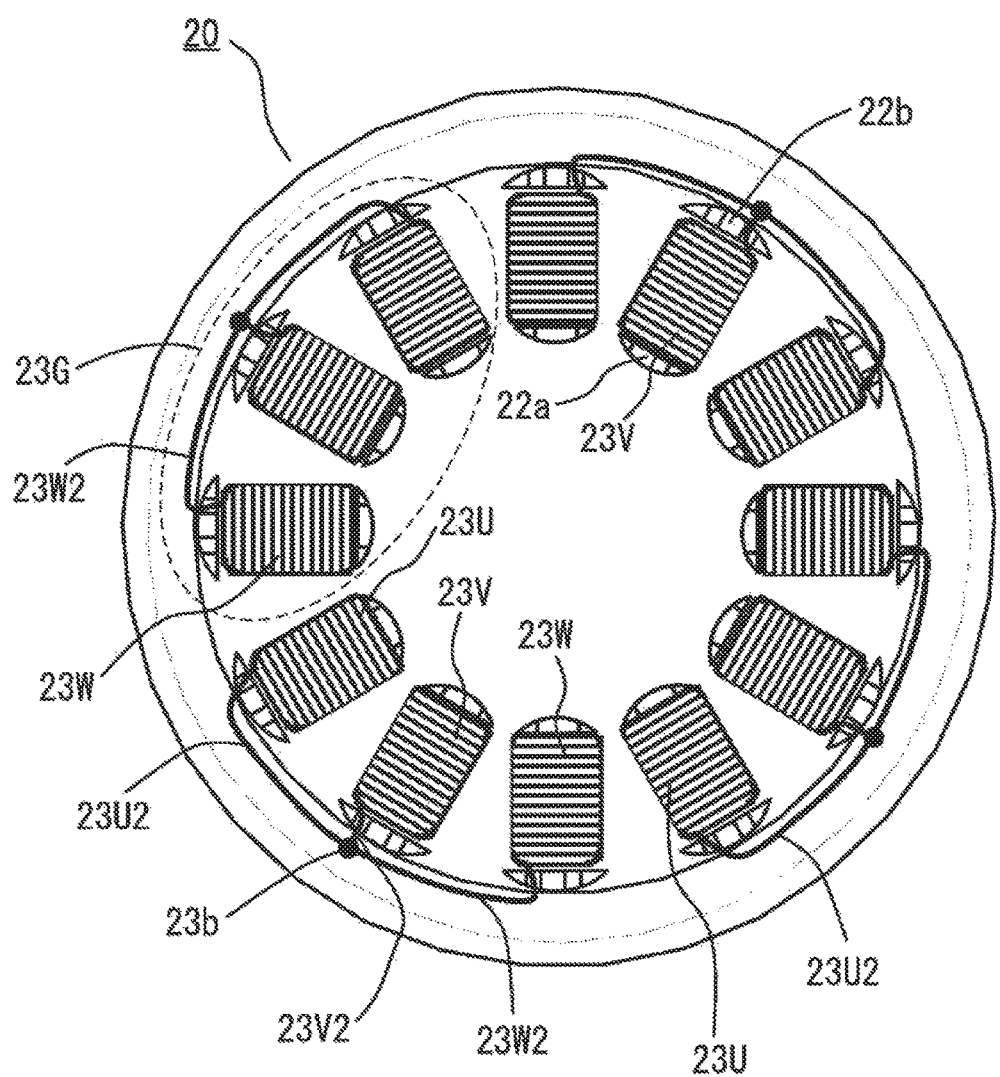
FIG. 3 is a back plan view of the stator 20 in FIG. 1.
Figure 4:
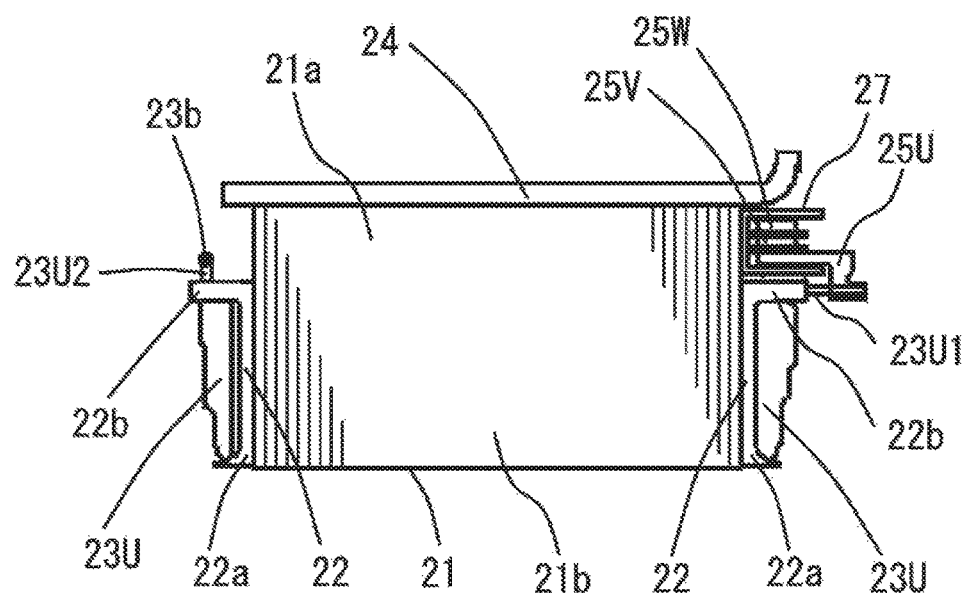
FIG. 4 is a sectional view along an A-A line in FIG. 2.
Figure 5:
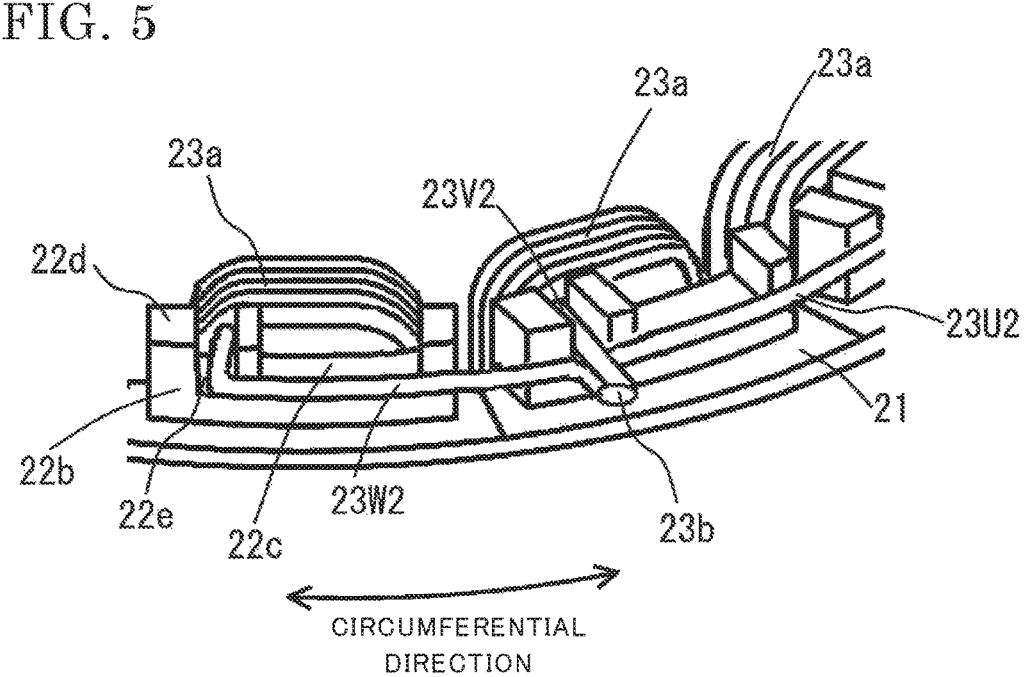
FIG. 5 is a perspective view around the other ends (23U2, 23V2, 23W2) of windings for the respective phases composing a coil group 23G in FIG. 3.

FIG. 1 is a sectional view of a rotating electric machine 100 according to embodiment 1 of the present invention. FIG. 2 and FIG. 3 are plan views schematically showing the configuration of a stator 20 of the rotating electric machine 100 shown in FIG. 1, FIG. 2 is a front plan view, FIG. 3 is a back plan view, and FIG. 4 is a sectional view along an AA line in FIG. 2. FIG. 5 is a perspective view around the other ends (23U2, 23V2, 23W2) of windings for the respective phases composing one coil group 23G in FIG. 3.

The rotating electric machine 100 shown in FIG. 1 includes a rotor 10 and the stator 20, and the outer circumferential surface of the rotor 10 is opposed to the inner circumferential surface of the stator 20 via a predetermined gap. The rotor 10 is fixed to a rotor shaft 60. The stator 20 is fitted to a cylindrical frame 70, Hereinafter, with reference to FIG. 2 to FIG. 5, components of the stator 20 according to embodiment 1 of the present invention will be described in detail.

The stator 20 includes: a stator core 21 having an annular shape; a bobbin 22 attached to the stator core 21; a stator coil 23 which is a winding wound on the stator core 21 via the bobbin 22; a core holder 24 holding the stator core 21; a plurality of power-supply bus bars 25 each electrically connected to one end of the stator coil 23; and a bus bar holder 27 holding the power-supply bus bars 25.

The stator core 21 has an annular core back portion 21a and a plurality of in the example in FIG. 2, twelve) tooth portions 21b protruding at regular intervals from the inner circumferential side of the annular core back portion 21a, and is formed by combining a plurality of divided cores divided for the respective tooth portions 21b in the core back portion 21a into an annular shape. The stator core 21 is pressed into the core holder 24. On the tooth portions 21b, three-phase coils composing the stator coil 23 described later are wound as shown in FIG. 2, for example.

The bobbin 22 is an insulating member which electrically insulates the stator coil 23 and the tooth portion 21b of the stator core 21 from each other, and is provided at both ends in the axial direction of the tooth portion 21b. The bobbin 22 may be integrated with the bus bar holder 27 described later.

As shown in FIG. 2 and FIG. 3, extending portions 22a and 22b which extend outward in the axial direction are provided on the inner circumferential side and the outer circumferential side of the bobbin 22, and the cross section of the bobbin. 22 thus has substantially a U shape as seen from the circumferential direction. As shown in FIG. 5, a slit 22c is formed in the vicinity of the center in the circumferential direction of the extending portion 22b provided on the outer circumferential side of the bobbin 22. In the example shown in FIG. 5, since the slit 22c is formed in the extending portion 22b of the bobbin 22, the stator coil 23 wound via the bobbin 22 is visible from outside in the radial direction, and a refrigerant 30 flows inward in the radial direction through the slit. 22c to collide with a coil end portion 23a of the stator coil 23. Without limitation thereto, any configuration that allows the refrigerant to collide with the coil end portion through the slit may be employed. For example, a slit, having a spiral shape may be formed, or a gap or a hole may be formed in the radial direction.

The refrigerant 30 may be air, or for example, may be an ATF (Automatic Transmission Fluid) which is a lubricant/hydraulic oil in an AT (Automatic Transmission) provided near the rotating electric machine 100. By dropping or spraying the ATF from the outer circumferential side of the stator 20, the stator 20 is cooled.

In an axial-direction end surface 22d on the outer circumferential side of the bobbin 22, a groove 22e for supporting the other end (23U2 to 23W2) of the stator coil 23 is formed. The groove 22e is formed in the radial direction up to the outer circumferential side of the bobbin 22 so that the position in the circumferential direction of the other end of the stator coil 23 is regulated. The other end of the stator coil 23 is supported in the groove 22e, whereby the position in the circumferential direction of the other end of the stator coil 23 is regulated.

The stator coil 23 is a winding wound around the tooth portion 21b of the stator core 21 via the bobbin 22. In more detail, the stator coil 23 is three-phase coils including a U-phase winding 23U, a V-phase winding 23V, and a W-phase winding 23W each composed of a plurality of windings, and generates a rotating magnetic field for rotating the rotor 10. One end of the stator coil 23 extends outward in the axial direction from one (right side in FIG. 4) of both end sides in the axial direction of the stator core 21, and then is electrically and mechanically connected to the power-supply bus bar 25 for the corresponding phase (in the example in FIG. 4, a U-phase bus bar 25U corresponding to the U-phase winding 23U). Since one end of the stator coil 23 extends outward in the axial direction, the dimension in the radial direction, i.e., the outer-diameter dimension can be reduced as compared to the case where one end of the stator coil extends in the circumferential direction. The other end (23U2, 23V2, 23W2) of the stator coil 23 extends in the outer-diameter direction from the other one (left side in FIG. 4) of both end sides in the axial direction of the stator core 21.

The windings 23U to 23W for the respective phases composing the three-phase coils (stator coil 23) forms a coil group 23G. FIG. 2 and FIG. 3 show the example in which the coil group 23G is composed of three windings which include one of each of the windings 23U to 23W for the respective phases, and four (a plurality of) such coil groups 23G are formed. Without limitation thereto, each coil group may include one or more of each of the windings for the respective phases. For example, each coil group may include a plurality of each of the windings for the respective phases. As an example in which each coil group includes a plurality of each of the windings for the respective phases, in the case where each coil group is composed of six windings which include two of each of the windings for the respective phases, the U-phase winding is composed of two windings (respectively referred to as a winding U1 and a winding U2), and if these windings are connected in parallel, one end and the other end each of the two U-phase windings correspond to one end and the other end of the above U-phase winding as in the case shown in FIG. 2 and FIG. 3. If these windings are connected in series (the other end of the winding U1 is connected to one end of the winding U2), one end of the winding U1 corresponds to one end of the above U-phase winding, and the other end of the winding U2 corresponds to the other end of the above U-phase winding. The same applies to the V-phase winding and the W-phase winding.

As described above, one end (23U1 to 23W1) of the winding for each phase composing each coil group 23G is connected to the power-supply bus bar 25 for the corresponding phase (U-phase bus bar 25U to W-phase bus bar 25W). Among the other ends (23U2 to 23W2) of the windings for the respective phases composing each coil group 23G, as shown in FIG. 5, the other end (23U2) of the U-phase winding 23U and the other end (23W2) of the W-phase winding 23W are both folded in the circumferential direction and extend in the circumferential direction toward the other end (23V2) of the V-phase winding 23V, and these other ends are mutually connected in the vicinity of the other end (23V2) of the V-phase winding 23V by, for example, TIG welding. That is, in each coil group 23G, the other ends (23U2, 23W2) of the windings for the phases positioned at both ends in the circumferential direction extend toward the other end (23V2) of the winding for the rest of the phases, whereby the other ends (23U2 to 23W2) of the windings for the respective phases composing each coil group 23G are mutually connected.

The core holder 24 is a ring-shaped holder which holds the stator core 21 from the outer circumferential side and from the one side in the axial direction of the rotating electric machine 100.

The power-supply bus bar 25 is a conductive member made of copper, a copper alloy, or the like, which is formed in a ring shape (annular shape), and is provided on one end side of the stator core 21, as shown in FIG. 4. The power-supply bus bar 25 includes a U-phase bus bar 25U, a V-phase bus bar 25V, and a W-phase bus bar 25W corresponding to the respective phases (U phase, V phase, and W phase) of the stator coil 23. The U-phase bus bar 25U is positioned on the inner side, and then the V-phase bus bar 25V and the W-phase bus bar 25W are overlaid in this order in the radial direction.

The bus bar holder 27 is, for example, a resin member having an electric insulating property, and holds the power-supply bus bar 25 (more specifically, the U-phase bus bar 25U, the V-phase bus bar 25V, and the W-phase bus bar 25W). The bus bar holder 27 is attached on the outer circumferential side of the bobbin 22 on one side in the axial direction of the stator core 21. The bus bar holder 27 may be integrated with the bobbin 22. The bus bar holder 27 has, for example, a recess-shaped holding groove 27b for holding the power-supply bus bar 25. The bus bar holder 27 holds, by the holding groove 27b, the U-phase bus bar 25U to W-phase bus bar 25W overlaid in the radial direction and inserted in the axial direction of the rotating electric machine 100. After the U-phase bus bar 25U to W-phase bus bar 25W are inserted into the bus bar holder 27 in the axial direction of the rotating electric machine 100, for example, an adhesive agent 26 such as silicon is applied between the bus bar holder 27 and the U-phase bus bar 25U to W-phase bus bar 25W, whereby they are bonded.

As described above, the stator 20 according to embodiment 1 of the present invention includes: the stator core 21 having the annular core back 21a and the plurality of teeth 21b; the plurality of windings 23 (23U, 23V, 23W) for U phase, V phase, and W phase wound around the teeth 21 and each having one end and the other end extending from one and the other one of both end sides in the axial direction of the stator core 21; the bobbin 22 insulating the stator core 21 and each winding 23 from each other; and the bus bars 25 (25U, 25V, 25W) for U phase, V phase, and W phase provided on one of both end sides in the axial direction of the stator core 21. Each coil group 23G is composed of the windings 23 (23U, 23V, 23W) for U phase, V phase, and W phase. One end (23U1, 23V1, 23W1) of the winding for each phase composing the coil group 23G is connected to the power supply bus bar 25 (25U, 25V, 25W) for the corresponding phase, and the other ends (23U2, 23W2) of the windings for the phases positioned at both ends in the circumferential direction in each coil group 23G extend toward the other end (23V2) of the winding for the rest of the phases, whereby the other ends (23U2, 23V2, 23W2) for the windings for the respective phases are mutually connected. Therefore, of the coil groups 23G adjacent to each other in the circumferential direction, the U-phase winding 23U of one coil group 23G and the W-phase winding 23W of the other coil group 23G are wound around the respective tooth portions 21b adjacent to each other in the circumferential direction, and the other ends of both windings extend in the circumferential direction from the other end side of the stator core 21 so as to extend in directions opposite to each other. Thus, a refrigerant passes through a gap formed between the other end sides of both windings, to collide with the coil end portions 23a of the stator coil 23, thereby cooling the coil end portions 23a. Therefore, the cooling performance for the windings 23 wound on the stator core 21 can be improved.

Each coil group 23G is composed of the windings (23U, 23V, 23W) for U phase, V phase, and W phase, and one end (23U1, 23V1, 23W1) of each winding 23 is connected to the power supply bus bar 25 (25U, 25V, 25W) for the corresponding phase. The other ends (23U2, 23V2, 23W2) of the windings 23 are mutually connected, and a connection portion 23b thereamong serves as a neutral point. Therefore, it is not necessary to separately provide a bus bar for neutral point connection as in the conventional art, the number of components is reduced, and the outer-diameter dimension of the stator can be reduced.

Thus, it is possible to provide the rotating electric machine 100 in which the outer-diameter dimension of the stator 10 is reduced and the cooling performance for the windings 23 wound on the stator core 21 is improved.

In embodiment 1 of the present invention, the extending portion 22b extending in the axial direction is provided on the outer circumferential side of each bobbin 22, and the slit 22c is formed in the extending portion 22b. Therefore, the refrigerant 30 present on the outer circumferential side of the stator 20 passes through the slit 22c to directly collide with the coil end portion 23a of each winding 23, thereby cooling the coil end portion 23a. Thus, the cooling performance for the windings 23 wound on the stator core 21 can be further improved.

In embodiment 1 of the present invention, the other ends (23U2, 23V2, 23W2) of the windings for the respective phases composing each coil group 23G extend in the outer-diameter direction from the other end side in the axial direction of the stator core 21, and the groove 22e as regulation means for regulating the positions in the circumferential direction of the other end (23U2, 23V2, 23W2) of the winding for each phase is further provided on the outer circumferential side of the bobbin 22. Therefore, the other end (23U2, 23V2, 23W2) of the winding for each phase is supported by the groove 22e, and the position in the circumferential direction thereof is regulated, whereby the other end of the winding for each phase can be prevented from expanding in the circumferential direction toward the winding adjacent thereto in the circumferential direction due to spring back of the winding, for example. Thus, the other ends of the windings of the adjacent coil groups can be prevented from contacting with each other, whereby insulation between the adjacent windings for the phases can be reliably secured. In the stator 20, the position in the circumferential direction of the other end (23U2, 23V2, 23W2) of the winding for each phase is regulated, and therefore the refrigerant stably flows to the other end (23U2, 23V2, 23W2) and the coil end portion 23a of the winding for each phase, thereby further improving the cooling performance.

The regulation means for regulating the position in the circumferential direction of the other end (23U2, 23V2, 23W2) of the winding for each phase is the groove 22e formed in the axial-direction end surface 22d of the bobbin 22 and supporting the other end (23U2, 23V2, 23W2) of the winding for each phase. Therefore, the other end (23U2, 23V2, 23W2) of the winding for each phase can be reliably fixed. As a result, it becomes possible to reliably make fixation at the connection point where the other ends (23U2, 23V2, 23W2) of the windings for the respective phases are mutually connected.

In the present embodiment 1, the other ends (23U2, 23V2, 23W2) of the windings for the respective phases are mutually connected by welding, and the grooves 22e for supporting the other ends (23U2, 23V2, 23W2) of the windings for the respective phases are provided, whereby the other ends (23U2, 23V2, 23W2) of the windings for the respective phases are reliably fixed. In order to improve the vibration resistance of the windings, the other end (23U2, 23V2, 23W2) of the winding for each phase may be bonded to the bobbin 22, using the adhesive agent 26, for example.

Figure 6:
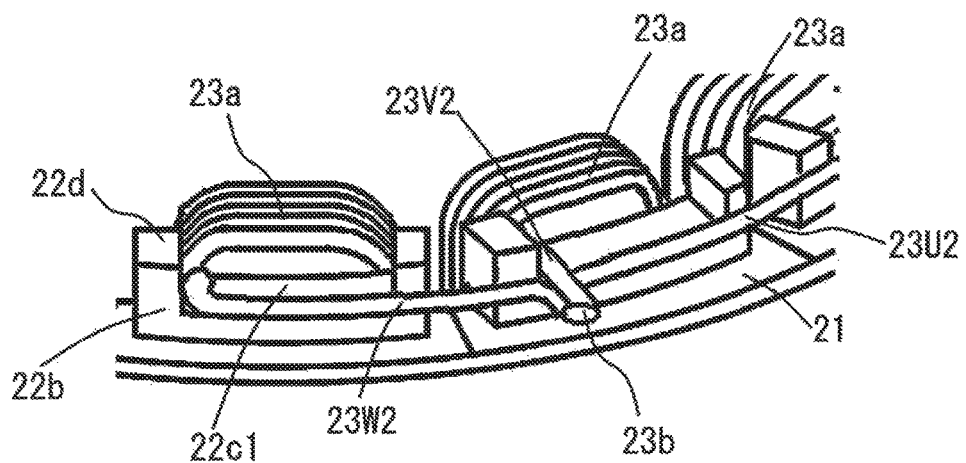
FIG. 6 shows a modification of a bobbin 22 shown in FIG. 5.
Figure 7:
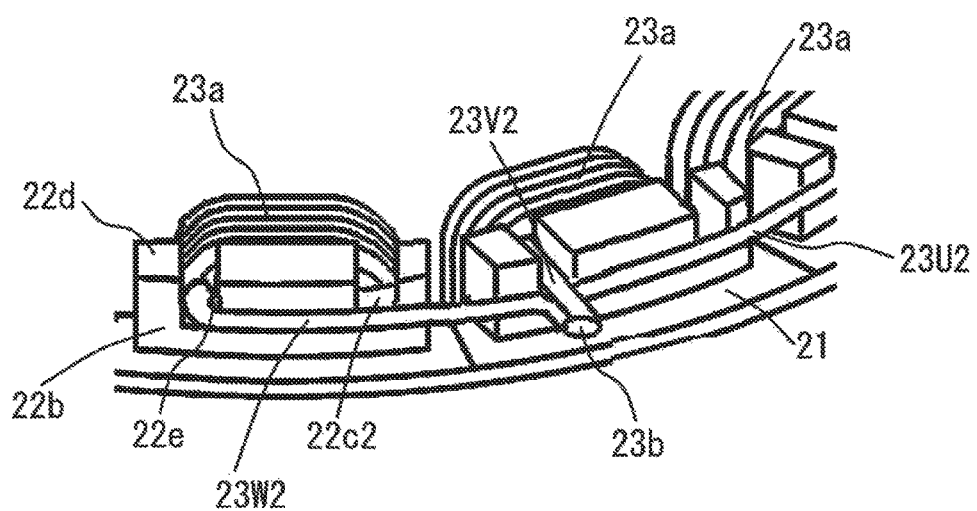
FIG. 7 shows another modification of the bobbin 22 shown in FIG. 5.

As the configuration of the slit 22c and the groove 22e, FIG. 5 has shown the case where, in the extending portion 22b provided on the outer circumferential side of the bobbin 22, the slit 22c is formed on the right side (right side in FIG. 5) as seen from the outer side in the radial direction, the groove 22e is formed on the left side (left side in FIG. 5) as seen from the outer side in the radial direction, and the slit 22c and the groove 22e are formed separately from each other. Without limitation thereto, as shown in FIG. 6, a slit 22c1 may be formed over the entirety of the coil end portion 23a, and the other end (23U2, 23V2, 23W2) of the winding for each phase may be supported in the slit 22c1. Alternatively, as shown in FIG. 7, a slit 22c2 having almost the same width in the circumferential direction as that of the groove 22e may be formed. In this case, the position in the circumferential direction of the other end of the winding for each phase (in the example in FIG. 7, 23U2, 23V2, 23W2) is regulated, and a part, the extending portion 22b of the bobbin 22, positioned between the groove 22e and the slit 22c2 serves as a stopper which prevents the other end of the winding for each phase in the example in FIG. 7, 23U2, 23W2) positioned at both ends in the circumferential direction from moving inward in the radial direction, whereby the other ends of the windings for the respective phases can be more reliably fixed, and thus fixation at the connection point can also be more reliably made.

Figure 8:
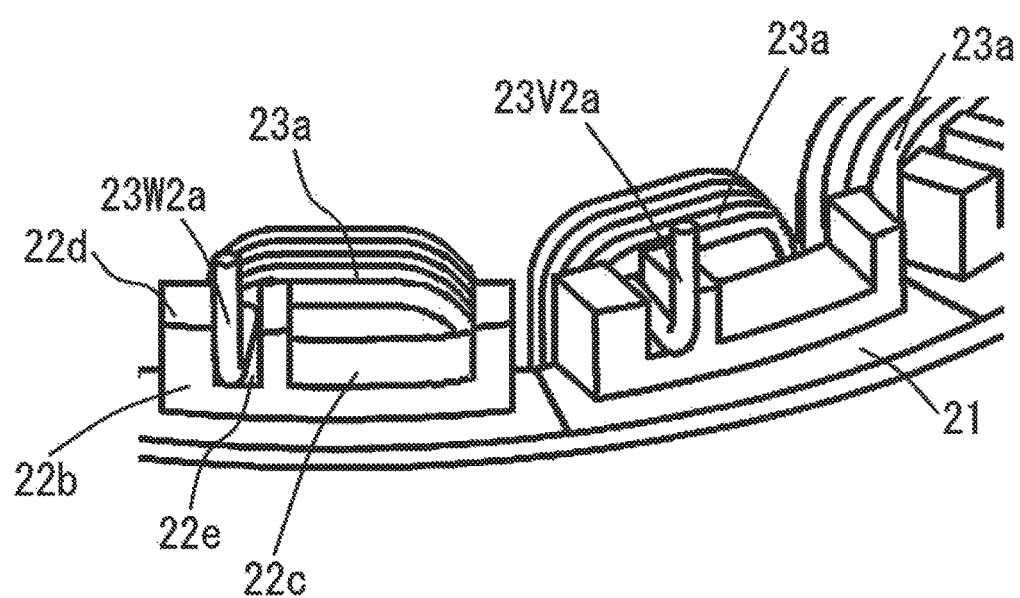
FIG. 8 shows a modification of the other ends (23U2, 23V2, 23W2) of the windings for the respective phases shown in FIG. 5.

As for the method for connecting the other ends of the windings for the respective phases, FIG. 5 to FIG. 7 have shown the example in which the other ends extend in the outer-diameter direction from the other end side of the stator core, then the other ends of the windings for the phases positioned at both ends are folded in the circumferential direction, and after welding, the other ends are folded outward in the axial direction, whereby they are mutually connected. Without limitation thereto, as shown in FIG. 8, the other ends (e.g. 23V2a and 23W2a) may extend in the outer-diameter direction from the other end side of the stator core, and then may be folded outward in the axial direction, and the other ends of the windings for the phases positioned at both ends may be folded in the circumferential direction, to be mutually connected by welding. In this connection method, at the time of winding, the coils (windings) can be prevented from being stretched outward in the radial direction after the coils are hooked in the grooves.

Figure 9:
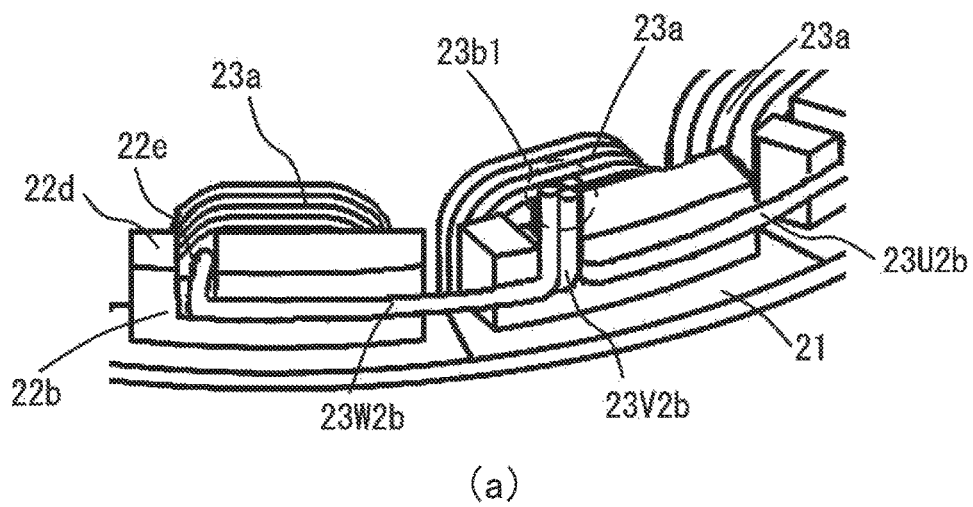
FIG. 9 shows another modification of the other ends (23U2, 23V2, 23W2) of the windings for the respective phases shown in FIG. 5, in which (a) shows a perspective view before welding and (b) shows a perspective view after welding.
Figure 9:
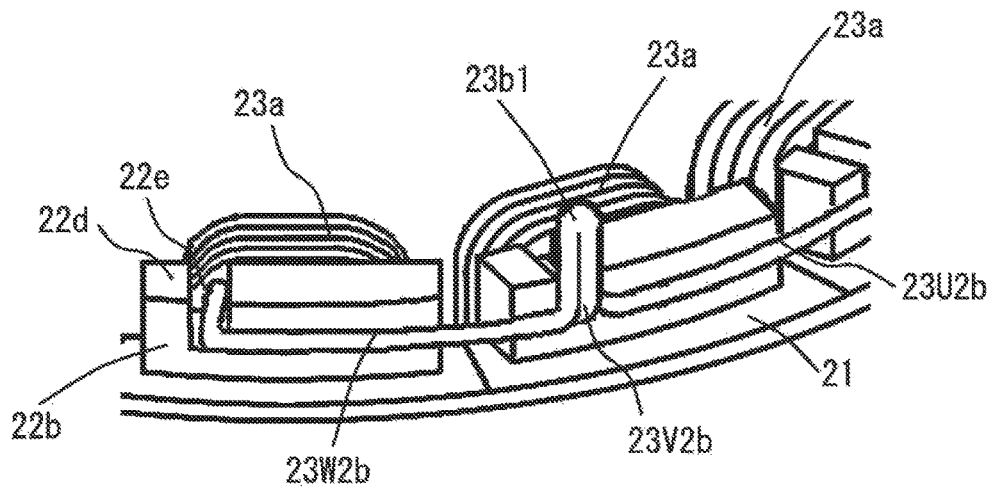

In the present embodiment 1, the case where both of the slit 22c and the groove 22e are formed in the bobbin 22 has been shown. However, needless to say, as shown in FIG. 9, only the groove 22e may be formed. FIG. 9 is perspective views around a connection portion 23b1, in which (a) shows a perspective view before welding and (b) shows a perspective view after welding. As shown in FIG. 9(a), the other ends (e.g., 23W2b, 23V2b and 23U2b) of the windings for the respective phases may be folded outward in the axial direction before welding, and then may be welded.

Figure 10:
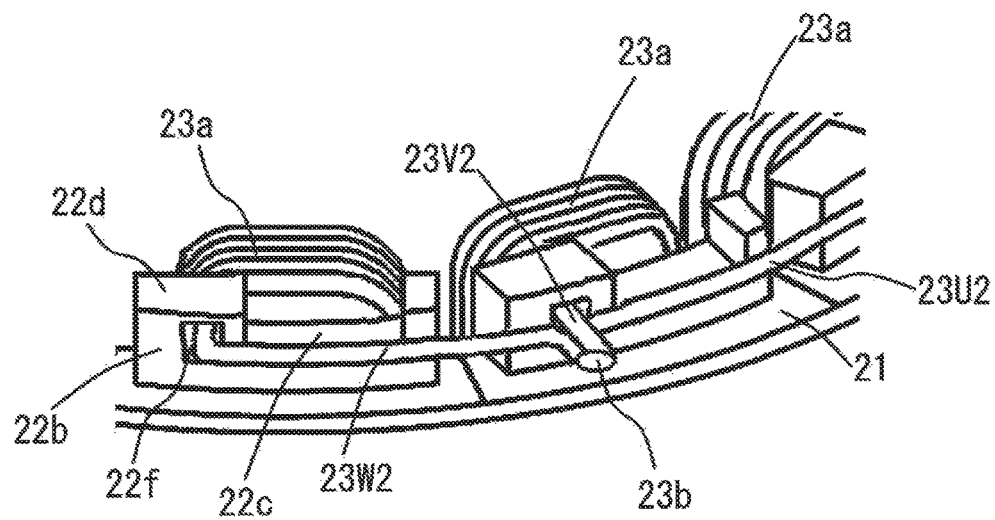
FIG. 10 shows still another modification of the bobbin 22 shown in FIG. 5.

In the present embodiment 1, the case where the regulation means for regulating the position in the circumferential direction of the other end (23U2, 23V2, 23W2) of the winding for each phase is the groove 22e formed in the axial-direction end surface 22d of the bobbin 22 and supporting the other end (23U2, 23V2, 23W2) of the winding for each phase, has been shown. However, instead of the groove 22e, as shown in FIG. 10, a through hole 22f may be formed through which the other end (23U2, 23V2, 23W2) of the winding for each phase penetrates. In this case, the position in the circumferential direction of the other end of the winding for each phase is regulated, and the position in the axial direction of the other end of the winding for each phase is also regulated, whereby the other end of the winding for each phase can be more reliably fixed. Thus, fixation at the connection point can also be more reliably made.

Embodiment 2

Figure 11:
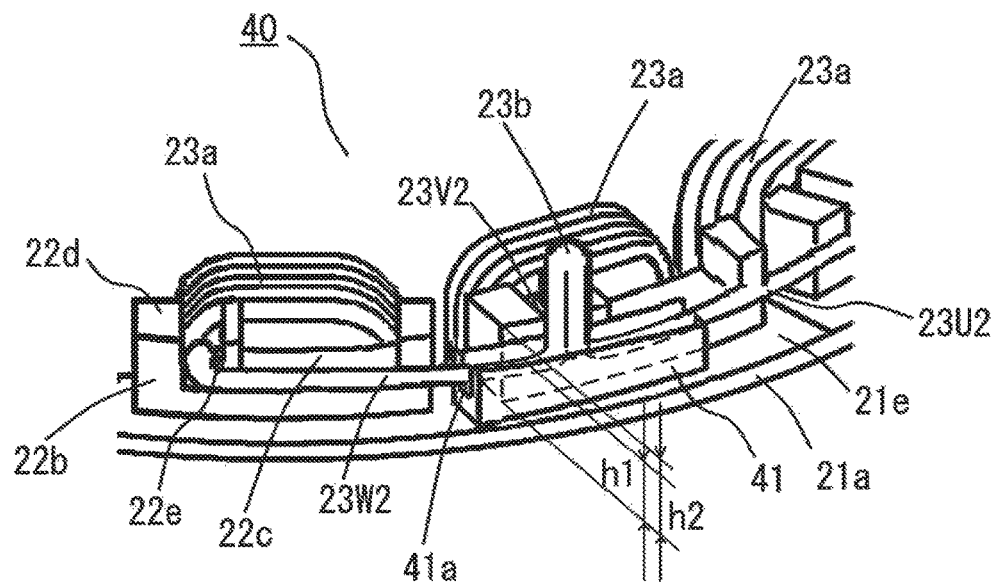
FIG. 11 is a perspective view around a neutral point holder 41 in a stator 40 of a rotating electric machine 200 according to embodiment 2 of the present invention.

Hereinafter, a rotating electric machine 200 having a stator 40 according to embodiment 2 will be described based on FIG. 11. FIG. 11 is a perspective view around a neutral point holder 41 in the stator 40 of the rotating electric machine 200 according to embodiment 2 of the present invention. As shown in FIG. 11, the rotating electric machine 200 having the stator 40 according to embodiment 2 is different from the rotating electric machine 100 shown in embodiment 1 in that the rotating electric machine 200 has the neutral point holder 41 holding the connection point where the other ends of the windings for the respective phases are connected. The other configuration is the same as that of the rotating electric machine 100 in the above embodiment 1, and therefore the detailed description thereof is omitted. Among reference characters in FIG. 11, the same reference characters as the aforementioned ones denote the same portions.

As shown in FIG. 11, the neutral point, holder 41 is, for example, a resin member having an electric insulating property, and holds the connection portion 23b at which the other ends (23U2, 23V2, 23W2) of the windings for the respective phases are connected. The neutral point holder 41 is provided on the outer circumferential side of the bobbin 22 on an axial-direction end surface 21e of the core back portion 21a on the other end side in the axial direction of the stator core 21. For example, by applying an adhesive agent 26 between the bottom surface of the neutral point holder 41 and the axial-direction end surface 21e of the core back portion 21a, the neutral point holder 41 is bonded and fixed to the axial-direction end surface 21e of the core back portion 21a. Without limitation thereto, for example, a protrusion protruding inward in the axial direction may be provided on the bottom surface of the neutral point holder, and a mortise may be provided in the axial-direction end surface of the core back portion of the stator core, whereby the protrusion provided on the neutral point holder may be fixed by the mortise of the stator core.

The axial length (h1) of the neutral point holder 41 is shorter than the axial length (h2) of the bobbin. 22 from the axial-direction end surface 21e of the core back portion 21a on which the neutral point holder 41 is provided (see FIG. 11). The neutral point holder 41 may be integrated with the bobbin 22. The linear expansion coefficient of the neutral point holder 41 is greater than the linear expansion coefficient of the stator coil 23. Since the linear expansion coefficient of the neutral point, holder 41 is greater than the linear expansion coefficient of the stator coil 23, even if the temperature of the stator 20 changes due to operation of the rotating electric machine, or the like, the connection portion 23b of the stator coil 23 can be held in the neutral point holder 41.

The neutral point holder 41 has, for example, a recess-shaped holding groove 41a for holding the connection portion 23b. The neutral point holder 41 holds the connection portion 23b by the holding groove 41a in a state in which the connection portion. 23b is inserted in axial direction of the rotating electric machine 200. After the connection portion 23b is inserted into the neutral point holder 41 in the axial direction of the rotating electric machine 200, for example, an adhesive agent 26 is applied between the neutral point holder 41 and the connection portion 23b, whereby they are bonded.

In embodiment 2, in addition to the effect in the above embodiment 1, since the neutral point holder 41 is provided for holding the connection portion 23h at which the other ends (23U2, 23V2, 23W2) of the windings for the respective phases are connected, the connection portion 23b can be more reliably fixed in the neutral point holder 41. Since the position in the circumferential direction of the connection portion 23b in the stator 40 is also fixed, insulation between the adjacent windings can be reliably secured, and since the position in the circumferential direction of the other end (23U2, 23V2, 23W2) of the winding for each phase is also regulated, a refrigerant stably flows to the other end (23U2, 23V2, 23W2) and the coil end portion 23a of the winding for each phase, thereby further improving the cooling performance.

In the case where the neutral point holder for holding the winding is provided to the outer circumference of the stator core, a refrigerant that has flowed inward in the radial direction flows on the outer circumferential side of the neutral point holder provided to the outer circumference of the stator core, but hardly flows on the inner circumferential side of the neutral point holder. Therefore, due to the neutral point holder provided on the outer circumference of the stator core, the cooling performance for the inner circumferential side of the neutral point holder around the outer circumference of the stator core might be deteriorated.

On the other hand, in embodiment 2 of the present invention, since the neutral point holder 41 is provided on the axial-direction end surface 21e of the core back portion 21a on the other end side in the axial direction of the stator core 21, a refrigerant flows also around the outer circumference of the stator core 21, whereby heat generated in the stator coil 23 and then transferred to the stator core 21 can be effectively cooled.

As compared to the stator in which the neutral point holder is provided on the outer circumferential side of the stator core, the size in the radial direction can be reduced by an amount corresponding to the radial length of a is part where the neutral point holder is provided, of the core back portion. Thus, downsizing in the radial direction of the stator can be achieved.

In embodiment 2 of the present invention, since the axial length (h1) of the neutral point holder 41 is shorter than the axial length (h2) of the bobbin 22 from the axial-direction end surface 21e of the core back portion 21, the height in the axial direction of the stator 40 does not change even though the neutral point holder 41 is provided. Thus, the neutral point holder 41 can be provided without increasing the length in the axial direction of the stator.

The rotating electric machines 100 and 200 shown in embodiments 1 and 2 of the present invention are general rotating electric machines having the rotor 10 and the stator 20 or the rotor 10 and the stator 40, and are applicable to a drive motor (electric motor) having a stator having the configuration as in the present invention, and also applicable to an electric generator such as an alternator or a motor generator having functions of an electric motor and an electric generator, for example.

DESCRIPTION OF THE REFERENCE CHARACTERS 10 rotor
20, 40 stator
21 stator core
21a core back portion
21b tooth portion
21e axial-direction end surface
22 bobbin
22a, 22b extending portion
22c slit
22d axial-direction end surface
22e groove (regulation means)
22f through hole (regulation means)
23, 23U, 23V, 23W stator coil (winding)
23a coil end portion
23h, 23b1 connection portion
23U1, 23V1, 23W1 one end of winding
23U2, 23V2, 23W2 another end of winding
24 core holder
25, 25U, 25V, 25W power-supply bus bar
26 adhesive agent
27 bus bar holder
27a holding groove
30 refrigerant
41 neutral point holder
41a holding groove
60 rotor shaft
70 frame
100, 200 rotating electric machine

The invention claimed is:
1. A rotating electric machine comprising:
a stator core having an annular core back and a plurality of teeth;
a plurality of windings for each of U phase, V phase, and W phase wound around the teeth and each having one end and the other end extending from one and the other one of both end sides in an axial direction of the stator core;

a bobbin insulating the stator core and each winding from each other; and a power supply bus bar for each of U phase, V phase, and W phase provided on the one of both end sides in the axial direction of the stator core, wherein a plurality of coil groups are formed each of which is composed of the windings for U phase, V phase, and W phase, each coil group including at least one of each of the one end and the other end of the winding for each phase composing the coil group, the one end of the winding for each phase composing each coil group is connected to the power supply bus bar for the corresponding phase, and the other ends of the windings for the phases positioned at both ends in a circumferential direction in each coil group extend toward the other end of the winding for the rest of the phases, whereby the other ends of the windings for the respective phases are mutually connected.

2. The rotating electric machine according to claim 1, wherein an extending portion which extends in the axial direction is provided on an outer circumferential side of the bobbin, and a slit is formed in the extending portion.

3. The rotating electric machine according to claim 1, wherein the other ends of the windings for the respective phases composing each coil group extend in an outer-diameter direction from the other end side in the axial direction of the stator core, the rotating electric machine further comprising regulation means provided on the outer circumferential side of the bobbin and regulating a position in the circumferential direction of the other end of the winding for each phase.

4. The rotating electric machine according to claim 3, wherein the regulation means is a groove formed on an axial-direction end surface of the bobbin and supporting the other end of the winding for each phase.

5. The rotating electric machine according to claim 3, wherein the regulation means is a through hole through which the other end of the winding for each phase penetrates.

6. The rotating electric machine according to of claim 1, further comprising a holder for holding a connection portion at which the other ends of the windings for the respective phases are connected.

7. The rotating electric machine according to claim 6, wherein the holder is provided on an axial-direction end surface of a core back on the other end side in the axial direction of the stator core.

8. The rotating electric machine according to claim 7, wherein an axial length of the holder is shorter than an axial length of the bobbin from the axial-direction end surface of the core back.

* * * * *